(12) United States Patent
Li

(10) Patent No.: US 6,754,662 B1
(45) Date of Patent: Jun. 22, 2004

(54) METHOD AND APPARATUS FOR FAST AND CONSISTENT PACKET CLASSIFICATION VIA EFFICIENT HASH-CACHING

(75) Inventor: Fulu Li, Nepean (CA)

(73) Assignee: Nortel Networks Limited (CA)

( * ) Notice: Subject to any disclaimer, the term of this patent is extended or adjusted under 35 U.S.C. 154(b) by 79 days.

(21) Appl. No.: 09/746,578

(22) Filed: Dec. 20, 2000

Related U.S. Application Data (60) Provisional application No. 60/222,199, filed on Aug. 1, 2000.

(51) Int. Cl.[7] .............................................. G06F 17/30
(52) U.S. Cl. ............................ 707/101; 707/1; 707/100
(58) Field of Search ........................... 707/1, 2, 3, 201, 707/100, 10, 101, 103, 104; 709/239

(56) References Cited

U.S. PATENT DOCUMENTS 5,784,539 A * 7/1998 Lenz ............................ 706/45
5,832,182 A * 11/1998 Zhang et al. .................. 706/50
6,212,184 B1 * 4/2001 Venkatachary et al. ...... 370/392
6,434,662 B1 * 8/2002 Greene et al. ............... 711/108

* cited by examiner

Primary Examiner—Charles Rones
(74) Attorney, Agent, or Firm—Steubing McGuinness & Manaras LLP (57) ABSTRACT

In accordance with a method and apparatus for classifying data packets, a packet classification architecture includes a cached hash table that stores a subset of classification identifiers (i.e. classIDs) for a plurality of data flows. A forwarding engine coupled to the cache receives packets and first attempts to classify the packet by generating a hash key based on header information from the packet and using the hash key to lookup a corresponding entry in the hash table. A hash caching policy according to the invention aims at maintaining high, classification speeds by (1) employing a hash function that evenly distributes hash key indexes, thus reducing the likelihood of collisions and by (2) employing a hash removal scheme that uses Internet traffic statistics and characteristics to improve the likelihood that hash entries corresponding to statistically important flows will remain cached.

38 Claims, 3 Drawing Sheets

FIG. 5

METHOD AND APPARATUS FOR FAST AND CONSISTENT PACKET CLASSIFICATION VIA EFFICIENT HASH-CACHING

FIELD OF THE INVENTION

The present application is based on, and claims priority from, U.S. Provisional Application No. 60/222,199, filed Aug. 1, 2000 and entitled "Fast and Consistent Packet Classification Scheme via Efficient Hash-Caching," commonly owned by the present assignee, the contents of which are incorporated herein by reference.

FIELD OF THE INVENTION

This invention generally relates to exchanging data over a data communications network and, more particularly, to a method and apparatus for classifying data packets in a network device.

BACKGROUND OF THE INVENTION

The introduction of new differentiated network services, such as Virtual Private Networks (VPN), firewalls, encryption, Network Address Translation (NAT), guaranteed Quality of Service. (QoS), traffic billing, etc., need an implementation of packet classification. In particular, for Diffserv edge routers in the newly-proposed DiffServ (Differentiated Services) architectures, the packet classification must be done at wire rate to guarantee the service agreed upon or purchased under a Service Level Agreement (SLA) i.e., the QoS.

Although the need for wire rate packet classification would seem to dictate a hardware approach, software-based fast packet classifiers offer low-cost implementation and high flexibility as compared to hardware-based approaches. However, software approaches suffer from the widening gap between CPU performance and memory-access latency. For example, most conventional CPUs operate at speeds in excess of 500 MHz, with each instruction cycle taking 2 nanoseconds. By comparison, the fastest widely available dynamic RAM (DRAM) runs at 60 nanoseconds, which means that a single memory fetch is approximately 30 times slower than a CPU instruction. Every indication suggests that CPU speed will continue to increase, while DRAM access speeds have remained stable for several years. Accordingly, an effective to software-based packet classification approach should consider memory latency issues.

As for existing packet classification schemes, most aim at accelerating the packet classification process. However, they are generally dependent on factors that are difficult to control. For example, packet classification schemes such as "Tuple Space Search" (TSS) and "Recursive Flow Classification" (RFC) aim at accelerating packet classification by performing some optimizations based on the sparse field-values distribution in the real-life filters set. Thus, the performance of those schemes will heavily depend on the actual field-values distribution for the real-life filters.

Other problems and issues are not adequately addressed by existing packet classification schemes. For example, it is noted that existing packet classification schemes do not take advantage of traffic information available from statistics of past performance. Moreover, although IP flows are not generally long-lived in most current applications, demand is growing for long-lived flows such as streamed multimedia data, Web cache server based traffic, persistent HTTP, Internet Telephony, FTP, etc. Finally, there are also no approaches that efficiently, accurately and consistently classify fragmented IP packets. It has been reported in some recent studies that the fragmentation ratio in today's Internet traffic is around 2% on the average. However, for some traffic flows, very high percentages up to 47% have been observed. To accurately and consistently classify the fragmented packets based on Layer-4 or Layer-7 information, per-flow tracking and management must be maintained due to the lack of the Layer4 and Layer-7 information-in the fragmented packet headers except the first one in each fragmentation family.

SUMMARY OF THE INVENTION

The present invention relates to a method and apparatus for classifying data packets.

A packet classification architecture according to the invention includes a cached hash table that stores a subset of classification identifiers (i.e. classIDs) for a plurality of data flows. A forwarding engine coupled to the cache receives packets and first attempts to classify the packet by generating a hash key based on header information from the packet and using the hash key to lookup a corresponding entry in the hash table. A hash caching policy according to the invention aims at maintaining high classification speeds by (1) employing a hash function that evenly distributes hash key indexes, thus reducing the likelihood of collisions and by (2) employing a hash removal scheme that uses Internet traffic statistics and characteristics to improve the likelihood that hash entries corresponding to statistically important flows will remain cached (i.e. those entries will have a higher probability of being accessed from the cache for incoming packets belonging to those flows).

In accordance with one aspect of the invention, a method of classifying a data packet includes generating a hash key based on flow information in the data packet, looking up, an entry among a plurality of entries in a hash table containing a classification identifier using the hash key, and maintaining the hash table in accordance with network traffic statistics.

In accordance with another aspect of the invention, an apparatus for classifying a data packet comprises a cache adapted to store a plurality of hash table entries, a forwarding engine coupled to the cache and having an input for receiving the data packet, the forwarding engine being adapted to retrieve a classification identifier from one of the hash table entries in the cache based on a hash key generated from flow information extracted from the received data packet, and a control engine coupled to the cache, the control engine being adapted to maintain the plurality of hash table entries in the cache in accordance with network traffic statistics.

BRIEF DESCRIPTION OF THE DRAWINGS

The present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
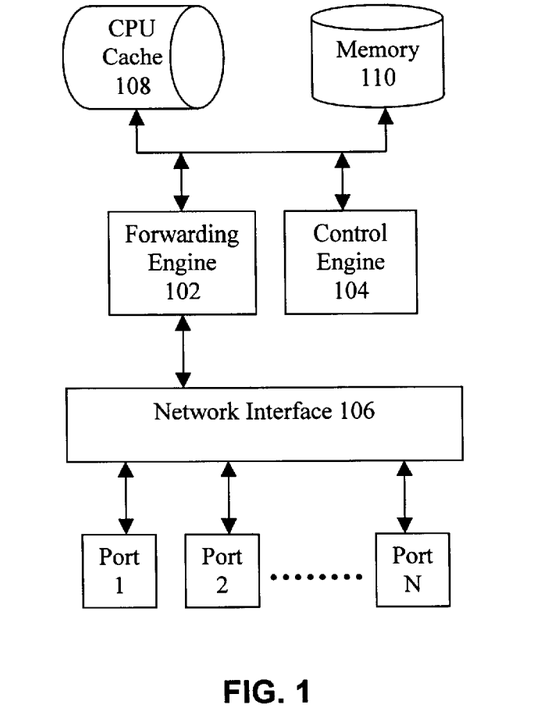
FIG. 1 illustrates an example of a packet classification architecture in accordance with an embodiment of the invention.

FIG. 1 is a block diagram showing a classification architecture 100 in accordance with one example of the invention. Such an architecture can be provided in, for example, an ISP routing switch, a DiffServ edge router, an enterprise access/firewall router, a general Internet access router, etc.

As shown in FIG. 1, there are two main engines in the example architecture: a forwarding engine 102, which performs the search for an appropriate classID for arriving packets, and a control engine 104, which is used to calculate the cache hit statistics and to maintain the cached hash table. In one example of the invention, each engine is implemented by a separate CPU, and each executes software stored in memory 110 and uses data stored in cache 108 and memory 110. Such a multiprocessor architecture as shown in FIG. 1 can substantially accelerate the packet classification process. However, it should be appreciated by those skilled in the art that the proposed hash-caching packet classification approach of the present invention is not limited thereto but can also be implemented by single-processor architectures or by programmable logic architectures such as ASICs.

As used herein, packet classification refers broadly and generally to the process of identifying which data packets receive what type of treatment. Such a process can be incorporated in any stage of a data path in a packet handling device.

Memory 110 includes stored information about how different classes of network traffic are identified and how they are to be treated. Such information can include SLAs for DiffServ networks, and other filters and parameters for establishing different levels of Quality or Class of Service for different flows of traffic. Filter entries in memory 110 can specify the characteristics of the given traffic and the corresponding treatment/action that traffic should receive. For example, a filter entry can specify that all traffic from a certain source address should be denied. Generally, flows of traffic requiring different service are identified by information that can be extracted from packet headers such as source and destination IP addresses, subnets, source and destination layer 4 ports application types, protocol numbers, incoming physical ports/interfaces, DiffServ Code Points (DSCP), etc. Depending on the type of device in which the classification architecture is provided, memory 110 may further tables for defining how traffic is to be switched between the different ports via network interface 106.

Cache 108 is preferably comprised of high-speed cache memory that is readily available to forwarding engine 102 and control engine 104. Cache 108 stores a hash table with entries filled by class of service identifiers (i.e. classIDs) for (generally) the most recently detected flows. These entries are accessed by a hash key index that is generated by a hash function from packet header information in a manner that will be discussed in more detail below.

Network interface 106 controls the flow of packets between different ports of the device and forwarding engine 102.

Figure 3:
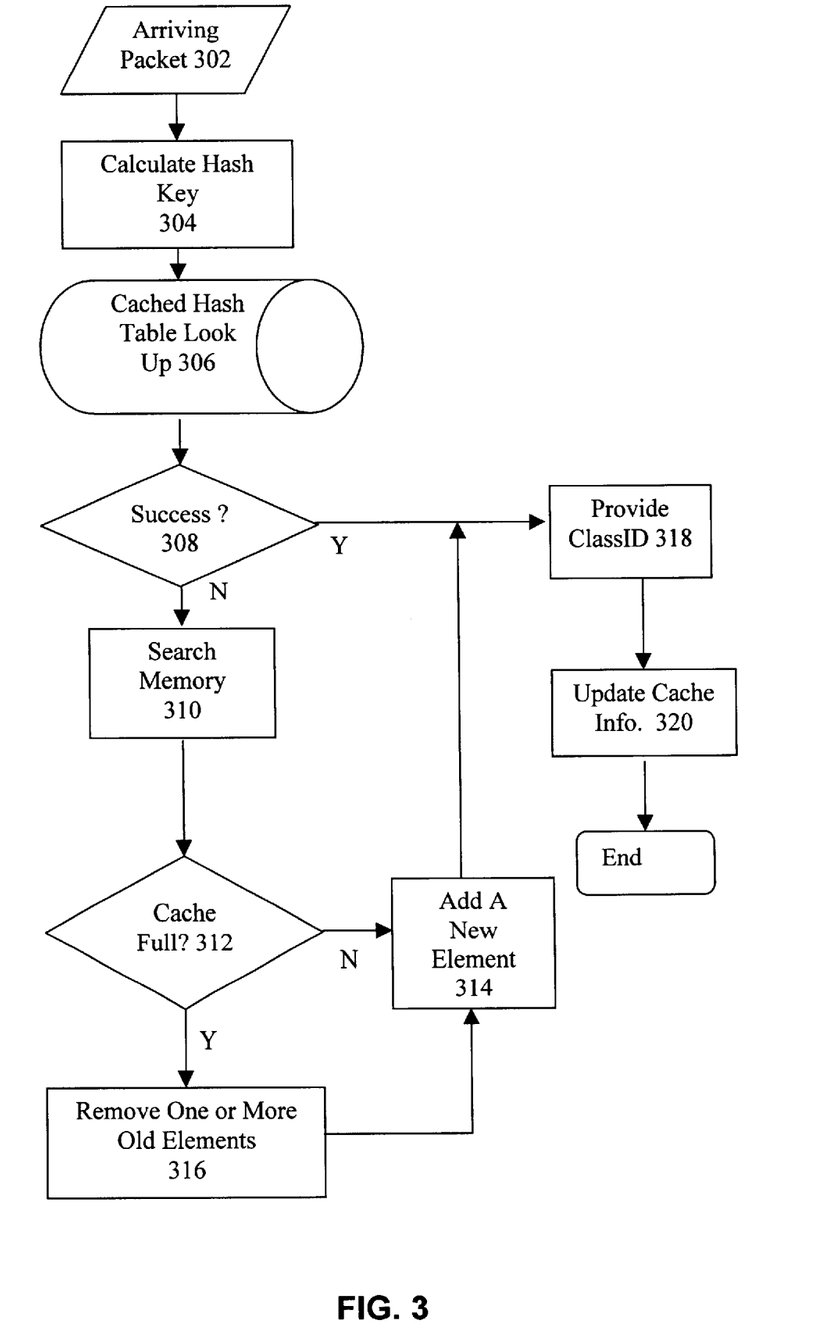
FIG. 3 is a flowchart illustrating an example process implemented by the packet classification architecture in FIG. 1 in accordance with an embodiment of the present invention.

FIG. 3 is a top level flow diagram illustrating an example operation of a device including the packet classification architecture of FIG. 1. As shown in FIG. 3, in block 302, incoming packets are received at the ports and forwarded via the network interface 106 to forwarding engine 102. Forwarding engine 102 first attempts to retrieve a classID for a defined flow corresponding to the incoming packet from cache 108 by calculating a hash key (block 304) and using it to lookup a corresponding entry in cache 108 (block 306). If the classID cannot be found in cache 108 (determined in block 308), forwarding engine 102 performs a search on stored classification information in memory 110 (block 310). Once the classID for the incoming packet is found in memory 110, a new entry containing the classID is created in cache 108 (block 314). If necessary (e.g., the cache 108 is full, as determined in block 312), an old entry is deleted from the cache 108 (block 316). The classID can then be provided to other processes that need it (block 318). Control engine 104 then updates the statistics it keeps for the cache 108 (block 320), which statistics may be used to oversee the removal and insertion of hash table entries as in block 316.

It should be noted that forwarding engine 102 may also perform further packet handling operations, such as forwarding the packet to another port based on switch or flow table information. Such operations may include handling the packet with a service level determined according to the classID associated with the packet. For example, in a DiffServ edge router, the packet classID can be associated with other DiffServ traffic conditioner components such as traffic policer, traffic marker, etc., the details of which are not necessary for an understanding of the present invention.

Figure 2:
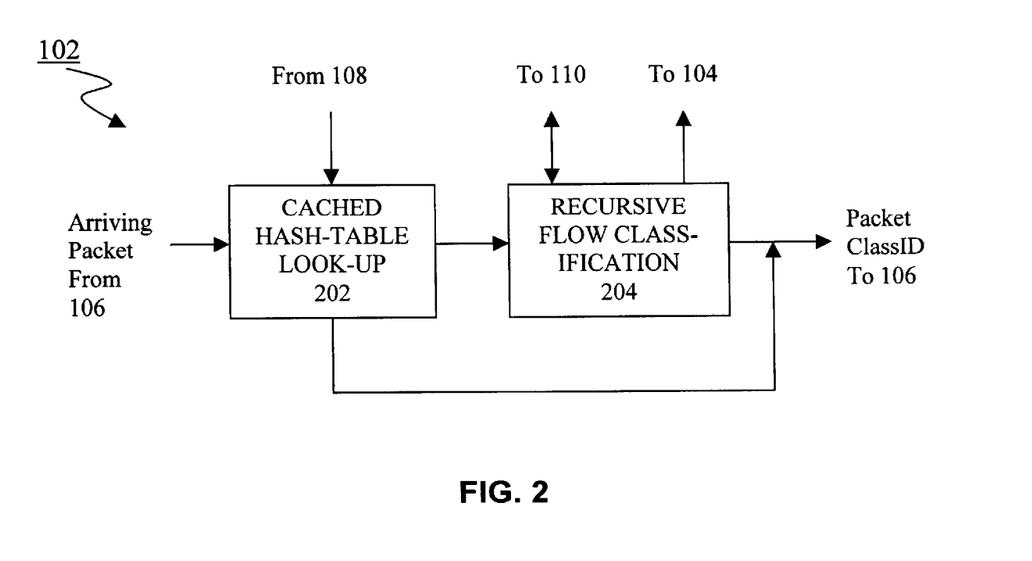
FIG. 2 is a block diagram of an example of a forwarding engine such as that included in the packet classification architecture in FIG. 1 in accordance with an embodiment of the invention.

FIG. 2 further illustrates a packet classification process performed by the forwarding engine 102 in accordance with an example of the present invention. It should be apparent, however, that forwarding engine 102 may include additional components for performing other routing or packet handling processes, such as flow table lookup, DiffServ policing/labeling and the like. The number and type of such other components may depend on the type of network device in which architecture 100 is included. For example, in a typical enterprise access/firewall router, only a packet classifier is needed to identify what packets get what treatment while a DiffServ edge router may further include other components such as a traffic policer, a traffic meter, a marker, etc. However, a detailed description of such additional components and other processes is not necessary for an understanding of the present invention.

As shown in FIG. 2, forwarding engine 102 includes two processes 202, 204. Hash look-up process 202 performs a look-up in the cached hash table for each arriving packet with the hash key based on a hash function, as will be explained in more detail below. RFC process 204 performs a search for the classID using, for example, known Recursive Flow Classification (RFC) techniques, for the arriving packet if the hash look-up fails.

RFC offers desired performance for packet classification in terms of speed, with the ability to classify 30 million packets per second using pipelined hardware, or one million packets per second using software. However, it should be noted that the RFC component 204 in the proposed architecture of FIGS. 1 and 2 can be easily replaced by other existing or future fast packet classification schemes such as Tuple Space Search (TSS). This is because the hash-caching lookup process 202 of the present invention and the RFC process 204 are completely independent of each other by design and during actual operation. The RFC process 204 is invoked only if the hash table lookup process 202 fails, which is preferably only for the first packet of a flow, given an efficient removal policy in the cache, a reasonable cache size and an efficient hash function, which are features of the packet classification approach of the present invention.

Figure 4:
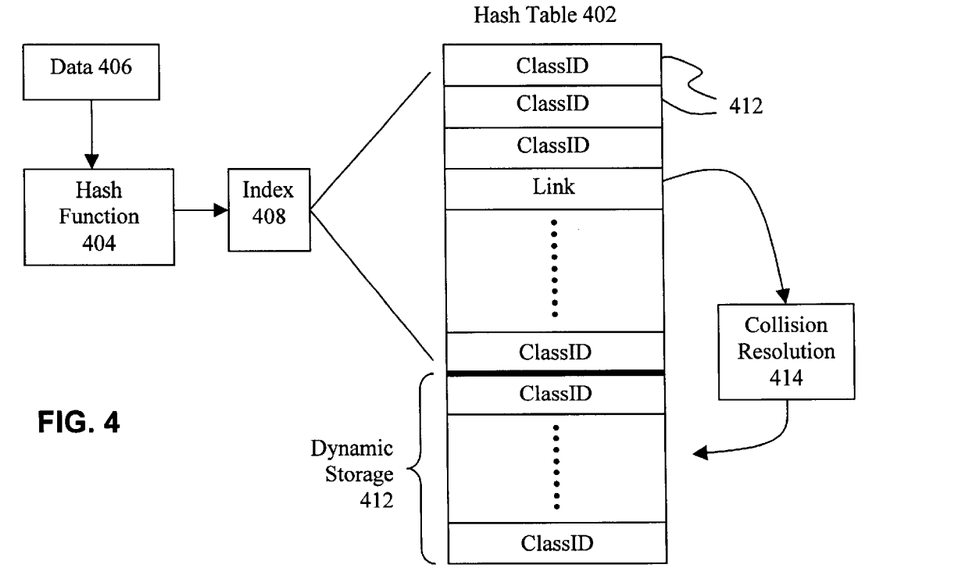
FIG. 4 illustrates an example of a packet classification hashing scheme in accordance with an embodiment of the present invention.

FIG. 4 is a block diagram illustrating a packet classification hashing scheme in accordance with an example of the present invention. Hash table 402 (maintained in cache 108, for example) allows non-sequential access to a given element through the use of a hash function 404 (implemented by hash table lookup process 202, for example). Hash function 404 is generally handed a data element 406, which data element is converted to an integer that is used as an index 408 into table 402.

Generally, there are two types of hash tables: a closed hash table and an open hash table. In a closed hash table, the number of items in the hash table is fixed. If the slot in the table is already occupied by another element when a new element is to be inserted, there is a collision. In this case, one can either generate another hash key, i.e., non-linear rehashing, or step through the table until an available slot is found, i.e., linear rehashing. In an open hash table, each element in the table is the head of a linked list of data items. In this model, a collision is handled by adding the colliding element to the linked list that begins at the slot in the table that both keys reference.

The structure of hash table 402 in one example of the invention is a "cross-product" of the closed hash table and the open hash table. To deal with collisions, each element 412 can include multiple dynamically allocated entries (i.e. a "bucket") in storage 410, in which sense it is like the open hash table. A link to the bucket is provided in the entry corresponding to the colliding index. A collision resolution function 414 (implemented by hash table lookup process 202, for example) uses the link and/or, for example, a balanced binary search tree data structure, to sort through the bucket of colliding entries provided in the dynamically allocated storage 410. It should be noted that the choice of data structures (i.e. a link list or a binary tree or other structure) may depend on the particular design objective of the packet classifier. For example, if simplicity is desired, a link list may be used, while if high speed is desired, a binary search tree may-be utilized. However, the total size limit for the hash table including the dynamically allocable entries in the real implementation is fixed, in which sense it is like the closed hash table. The fixed limit size of the hash table 402, i.e., the size of the cache 108, can depend on the environment in which the packet classifier is used. For example, the cache for the packet classifier used in a LAN router or a regional router can be much smaller than that used in a backbone router.

The data input to the hash function 404 in accordance with one implementation of the invention includes six fields from the packet header: the source network-layer address SRCaddr (32-bits), destination network-layer address DSTaddr (32-bits), the source transport-layer port number SRCport (16-bits for TCP and UDP), destination transport-layer port number DSTport, the Type-of-Service (TOS) field (8-bits) and the protocol (PROT) field (8-bits).

The hash function 404 is preferably optimized to accelerate the packet classification process. The hash function 404 thus preferably implements bit-wise manipulations one per-byte basis to achieve time savings over arithmetic operations. It is further preferable to distribute keys throughout the hash table as evenly as possible to minimize the possibility of collisions.

A basis for some of the operations of the hash function 404 in accordance with one example is a circular left shift operation $S(x, m, n)$, which is given by:

$$S(x, m, n) = (x<<n) \text{ OR } (x>>(m-n)), m>n \quad (\text{Eq. 1})$$

where x is the value to be shifted, m is the number of bits in x and n is the numbers of bits to the left by which to circularly shift x during the operation.

To get even hash key distribution, some of the packet header data used for packet classification needs to be swapped. This is because packet header data is in network byte order with big-endian, i.e., the most significant byte has the lowest address. The most common family of Intel microprocessors are little-endian, i.e., the bytes at lower addresses have lower significance.

The hash function 404 calculates the hash key index (Hkey) from the header information and hash table size (HTableSize) as follows:

$$Hkey = (S(SRCaddr, 32, 16) + \\ S(DSTaddr, 32, 16) + S(SRCport, 16, 8) + \\ S(DSTport, 16, 8) + TOS + PROT) \&(HTableSize) \quad (\text{Eq. 2})$$

As should be apparent from Eq. 2 and the discussion above, the hash function of the present invention includes a number of features that improve hashing performance. For example, the logic AND operation is used with the hash table size instead of the commonly-used MODULO operation since a typical MODULO operation requires 41 CPU cycles while an AND operation only requires 1 CPU cycle.

The size of table 404 is further preferably selected to that the value of HTableSize is in the form of "111 . . . 111 (binary)." This allows the result of the AND operation in Eq. 2 to yield a unique hash key index for as many flows as possible, thus reducing the likelihood of collisions. Further, although the present hashing function in Eq. 2 spreads the possible key values evenly across all the different positions in the hash table (by, for example, swapping the bytes in the header information), another way to reduce collisions is to make the table larger. As those skilled in the art understand; a reasonable hash table size promotes hashing performance, and such a size is typically tuned carefully in view of a variety of design considerations.

Finally, as shown above, another way the present invention improves hashing performance is to sort the elements with the same hash key in the same "bucket." A linked implementation of some sort with balanced binary-search-tree data structure can then be provided to deal with the collisions.

In summary, the cached hash table 402 and the lookup process 202 convert the complicated search of the whole set of filters to a simple cache look-up process, thus reducing the processing time required for packet classification. Whenever an arrival packet is to be classified, look-up process 202 checks the cached hash table 402 in cache 108 to see if a classID corresponding to the six selected packet header fields is contained in the cache. If it is contained in the cache (called a cache hit), the corresponding packet classID is provided to whatever other functions that need it for packet forwarding. Otherwise (called a cache miss), RFC process 204 must be invoked to search for the set of filters required for the packet and the search result will be added in the cache 108 as a new entry of the hash table 402.

Figure 5:
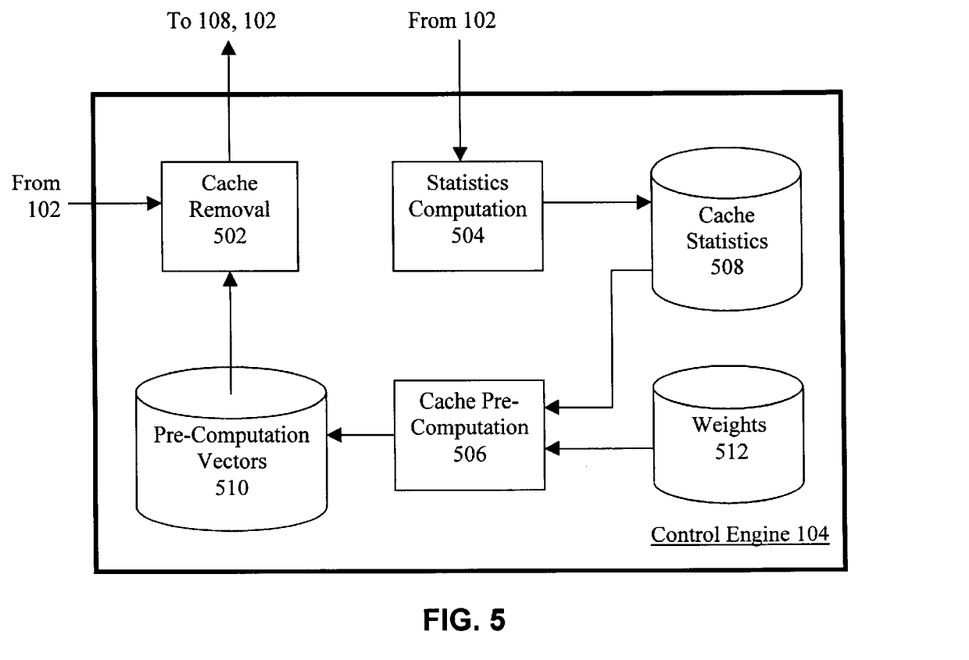
FIG. 5 is a block diagram of an example of a control engine such as that included in the packet classification architecture in FIG. 1 in accordance with an embodiment of the invention.

As mentioned above, control engine 104 is responsible for keeping statistics on cache performance and for maintaining the cache 108. An example of the processes that can be implemented by control engine 104 is illustrated in FIG. 5. As shown in FIG. 5, control-engine 104 includes a cache removal process 502 that is responsive to requests from forwarding engine 102 to replace cache entries when, for example, the cache is full and a new classID for a flow is found. Control engine 104 further includes a statistics computation process 504 that keeps statistics such as the number of times an entry has been accessed (i.e. cache hits) since being entered in the cache, and the duration of time since an entry has been accessed. These statistics are kept in store 508, where they can be accessed by pre-computation process 506. Process 506 weights these statistics using weights 512 and periodically and continually calculates pre-computation vectors containing removal policy parameter values for each of the entries in the cache. The vectors are kept in store 510, where they are accessed on demand by cache removal process 502 for rapid cache entry removal calculations.

As should be apparent, at certain times one or more entries of the hash table in the cache should be selected for removal. This might happen when the cache space consumed by hash entries reaches a certain threshold of the total available cache space, or on a cache miss when there is no free space to add the new search result by RFC in the cache. Meanwhile, it should be apparent that the higher the cache hit rate, the lower the average time that the packet classification will take. The cache removal policy implemented by control engine 104 can thus substantially effect the cache performance. In other words, to achieve a desired cache hit rate, choosing an efficient removal algorithm becomes important to the design and implementation of a cache system.

Several cache replacement algorithms have been commonly used in cache systems, including the Least Recently Used (LRU) algorithm based on the access recency for each cache entry, the Least Frequently Used (LFU) algorithm based on the access frequency for each cache entry, and their variants. However, no existing cache removal algorithm takes into account the characteristics of Internet traffic available from statistics, which characteristics can be used to maximize the cache hit rate and thus the performance of the cache system.

In accordance with an aspect of the invention, therefore, the removal algorithm implemented by control engine 104 takes advantage of Internet traffic patterns and characteristics. For example, it has been observed that flow length distribution in terms of the number of packets is remarkably long tailed, meaning that the more packets there are in a flow (i.e. the longer the flow becomes), the less frequently the packets are received. Accordingly, removal of cache entries corresponding to flows should be deferred until a statistical threshold of packets has been processed. Meanwhile, different applications have other different traffic characteristics.

For example, in terms of total numbers of packets, DNS application flows are normally small and FTP application flows are normally large. In terms of duration, streamed multimedia data and Internet Telephony flows are normally long.

In one example of the invention, control engine 104 implements a removal algorithm that is a hybrid algorithm combining the weighted properties of LRU, LFU as well as the characteristics of the Internet traffic. The notations in the following Table 1 refer to some of the properties used by the removal algorithm.

TABLE 1

| | |
|---|---|
| N: | the number of currently stored elements in the cache. |
| $n_{r,i}$: | the number of references to the element $i$ since it last entered the cache. |
| $t_c$: | the current clock time. |
| $t_{f,i}$: | the time point for element $i$ at which it last entered the cache. |
| $t_{L,i}$: | the time duration for element $i$ since it is last referenced. |
| $W_f$: | the constant weight set for the reference frequency. |
| $W_r$: | the constant weight set for the reference recency. |
| $W_a$: | the constant weight set for the application type. |
| $W_p$: | the constant weight set for the flow length popularity. |

The weights, e.g., $W_f$, $W_r$, $W_a$, $W_p$, can be adjusted dynamically from the empirical results based on cache performance. For example, in applications where LFU appears to be a less efficient algorithm than LRU, the weights can be adjusted such that $W_f < W_r$ as default. LFU can be determined using statistics compiled by statistics computation process 504, including $n_{r,i}$, $t_c$ and $t_{f,i}$. LRU can be determined by statistics compiled by process 504 including $t_{L,i}$.

Certain other traffic statistics are determined by computation process 504 from the type of network application associated with the cache entry. For example, the function(i) is a two-phased function based on the application type of the flow associated with the cache entry, wherein:

$$f(i) = \begin{cases} 0 & \text{if element}(i) \in \text{other applications} \\ 1 & \text{if element}(i) \in \text{(streamed media, FTP, Internet Telephony)} \end{cases} \quad \text{(Eq. 3)}$$

It should be noted that other emerging long-lived application types can be added in the above Eq. 3 and that the invention is not limited to those listed here.

The observed flow length distribution trend as mentioned above can be modelled as follows: the range of possible flow lengths is divided into contiguous buckets, e.g., 1~100 packets, 101~200 packets, 201~400 packets, 401~600 packets, 601~800 packets, and larger than 801 packets. A function g(x) as defined below is used to calculate the bucket index, which can then be used by computation process 504 to determine the flow length popularity P(i) of a flow associated with a given cache entry i.

$$g(x) = \begin{cases} 1, & x \in [1, \ldots, 100], \\ 2, & x \in [101, \ldots, 200], \\ 3, & x \in [201, \ldots, 400], \\ 4, & x \in [401, \ldots, 600], \\ 5, & x \in [601, \ldots, 800], \\ 6, & x \in [801, \ldots, \infty], \end{cases} \quad \text{(Eq. 4)}$$

The flow length popularity P(i) is given as follows:

$$P(i) = \frac{1/i^3}{\sum_{i=1}^{6} 1/i^3}, i = 1, \ldots 6. \quad \text{(Eq. 5)}$$

Overall, cache removal process 502 removes the cache entry i for which the minimal value of the following expression is reached:

$$\left(\frac{n_{r,i}}{t_c - t_{f,i}} \times W_f + \frac{1}{t_{l,i}} \times W_r + W_a \times f(i) + W_p \times P(g(n_{r,i}))\right), \quad \text{(Eq. 6)}$$

$$\text{for } 1 \leq i \leq N$$

It should be apparent that if $W_f = W_a = 0$, the removal policy will only depend on the element access recency and the flow length popularity. Similarly, if $W_f = W_p = 0$, the removal policy will be only determined by the element access recency and the element's application type; if $W_a = W_p = 0$, the removal policy will be only based on the element access frequency and the element access recency. Finally, if $W_f = W_a = W_p = 0$, the removal policy will be only based on the element access recency.

Rather than directly computing all the values in Eq. 6, cache removal process 502, in one example of the invention, uses pre-computed vectors stored in store 510.

For example, pre-computation process 506 can compute a vector $P = \{P_i\}$, which contains the pre-computation value of the expression:

$$W_p \times P(i) = W_p \times \frac{1/i^3}{\sum_{i=1}^{6} 1/i^3} (i = 1 \ldots 6) \quad \text{(Eq. 7)}$$

for all the hash table entries. Similarly, a vector $F = \{F_i\}$ for storing the pre-computation value of the expression:

$$W_f \times \frac{n_{r,i}}{t_c - t_{f,i}} \quad \text{(Eq. 8)}$$

a vector $R = \{R_i\}$ for storing the pre-computation value of the expression:

$$W_r \times \frac{1}{t_{l,i}} \quad \text{(Eq. 9)}$$

and a vector $A = \{A_i\}$ for storing the pre-computation value of the expression:

$$W_a \times f(i) \quad \text{(Eq. 10)}$$

can be pre-computed by process 506 using the statistics 508 compiled by process 504 and the weights stored in 512. The calculation of Eq. 6 by cache removal process 502 can thus be accelerated by accessing the pre-computation vectors on demand rather than performing all the calculations repeatedly. It should be apparent that this is only one example of the invention, and that cache removal process 502 can directly compute all components of Eq. 6 on demand, and that the vector pre-computation may be skipped altogether.

As another example, the combined pre-computation values of expression (6) for each current element i in the cache can be sorted and the sorted link list is can then be updated once the cache removal condition is met.

It should be noted that, in addition to speed advantages of all types of Internet traffic, the packet classification approach of the present invention provides other advantages as well. For example, as noted above, to accurately and consistently classify fragmented packets based on Layer 4 or Layer-7 information, conventional per-flow tracking and management must be maintained due to the lack of the Layers-4 and Layer-7 information in the fragmented packet header except the first one in each fragmentation family. By using the hash-caching approach of the present invention, however, once the classified information of a full packet belonging to the same flow is cached in the hash table, all of the subsequent fragmented packets in the same flow can be processed accurately and consistently with the same classID, which can be accessed from the cache using their same sub-Layer-4 information such as source IP address, destination IP address, and unique IP identification number (used to identify families of fragmented packets).

Similarly, the present invention can improve packet classification for long-lived flows such as streamed multimedia data, Web cache server based traffic, persistent HTTP, Internet telephony, etc. Once the first packet of the flow is classified and related information is cached in the hash table, all subsequent packets in the same flow can be classified using only one high-speed memory access, thus dramatically improving the packet classification speed.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. An apparatus for classifying a data packet, comprising:
   a cache adapted to store a plurality of hash table entries;
   a forwarding engine coupled to the cache and having an input for receiving the data packet, the forwarding engine being adapted to retrieve a classification identifier from one of the hash table entries in the cache based on a hash key generated from flow information extracted from the received data packet; and
   a control engine coupled to the cache, the control engine being adapted to maintain the plurality of hash table entries in the cache in accordance with network traffic statistics, the control enrine being adapted to select the replaced hash table entry in accordance with a combined relative weight of an access recency, an access frequency, an application type, and a flow length popularity of a flow corresponding to the replaced hash table entry.

2. An apparatus according to claim 1, wherein the forwarding engine and the control engine are comprised of separate CPUs, the cache being comprised of high-speed cache memory.

3. An apparatus according to claim 1, wherein the forwarding engine and the control engine are comprised of a common CPU, the cache being comprised of high-speed cache memory.

4. An apparatus according to claim 1, further comprising:
   a memory adapted to store flow classification information, the memory being separate from the cache;
   wherein the forwarding engine is further adapted to search for the classification identifier in the memory if it cannot be found in the cache.

5. An apparatus according to claim 4, wherein the control engine is further adapted to add the classification identifier to the cache in accordance with a hash policy.

6. An apparatus according to claim 4, wherein the control engine is further adapted to add the classification identifier to a replaced one of the hash table entries, the control engine being adapted to select the replaced hash table entry in accordance with an application type of a flow corresponding to the replaced hash table entry.

7. An apparatus according to claim 4, wherein the control engine is further adapted to add the classification identifier to a replaced one of the hash table entries, the control engine being adapted to select the replaced hash table entry in accordance with a flow length popularity of a flow compounding to the replaced hash table entry.

8. An apparatus according to claim 1, wherein the forwarding engine is further adapted to extracting packet data header field corresponding received data packet and to swap bits in certain of the packet data header fields, whereby hash keys are evenly distributed among entries in the hash table.

9. An apparatus for classifying a data packet, comprising:
   means for generating a hash key based on flow information in the data packet;
   means for looking up an entry among a plurality of entries in a hash table containing a classification identifier using the hash key; and
   means for maintaining the hash table in accordance with network traffic statistics, wherein the maintaining means includes:
      means for assigning a first relative weight to an access recency of each of the plurality of entries;
      means for assigning a second relative weight to an access frequency of each of the plurality of entries;
      means for assigning a third relative weight to an application type of each of the plurality of entries;
      means for assigning a fourth relative weight to a flow length popularity of each of the plurality of entries; and
      means for considering the combined weighted access recency, access frequency, application type, and flow length popularity of each of the plurality of entries.

10. An apparatus according to claim 9, further comprising:
   means for searching for the classification identifier in a storage different than the hash table in response to a failure of the look-up means; and
   means for adding a new entry to the hash table containing the classification identifier.

11. An apparatus according to claim 10, wherein the maintaining means includes means for removing an old entry from the hash table to accommodate the new entry.

12. An apparatus according to claim 11, wherein the removing means includes means for considering an application type of a flow corresponding to the old entry.

13. An apparatus according to claim 11, wherein the removing means includes means for considering a flow length popularity of a flow corresponding to the old entry.

14. An apparatus according to claim 10, wherein the searching means is adapted to implement a recursive flow classification process.

15. An apparatus according to claim 10, wherein the searching means is adapted to implement a tuple space search process.

16. An apparatus according to claim 9, wherein the maintaining means includes means for considering an application type of a flow corresponding to each of the plurality of entries.

17. An apparatus according to claim 9, wherein the maintaining means includes means for considering a flow length popularity of a flow corresponding to each of the plurality of entries.

18. An apparatus according to claim 9, further comprising:
   means for pre-computing vectors corresponding to the weighted access recency, access frequency, application type, and flow length popularity of each of the plurality of entries.

19. An apparatus according to claim 9, wherein the generating means includes:
   means for extracting packet data header fields corresponding to the flow information from the data packet; and
   means for swapping bits in certain of the packet data header fields whereby hash keys are evenly distributed among entries in the hash table.

20. An apparatus according to claims 19, wherein the packet data header fields include one or more of a source network layer address, a destination network layer address, a source transport layer port number, a destination transport layer port number, a type of service field, and a protocol field.

21. An apparatus for classifying a data packet, comprising:
   means for generating a hash key based on flow information in the data packet;
   means for looking up an entry among a plurality of entries in a hash table containing a classification identifier using the hash key;
   means for maintaining the hash table in accordance with network traffic statistics wherein the maintaining means includes means for removing an old entry from the hash table to accommodate the new entry, wherein the removing means includes the steps of:
      means for assigning a first relative weight to an access recency of the old entry;
      means for assigning a second relative weight to an access frequency of the old entry;
      means for assigning a third relative weight to an application type of the old entry;
      means for assigning a fourth relative weight to a flow length popularity of the old entry; and
      means for considering the combined weighted access recency, access frequency, application type, and flow length popularity of the old entry;
   means for searching for the classification identifier in a storage different than the hash table in response to a failure of the look-up means; and
   means for adding a new entry to the hash table containing the classification identifier.

22. An apparatus according to claim 9, further comprising:
   means for resolving a collision between the generated hash key and another hash key generated from different flow information.

23. A method of classifying a data packet, comprising the steps of:
   generating a hash key based on flow information in the data packet;
   looking up an entry among a plurality of entries in a hash table containing a classification identifier using the hash key; and
   maintaining the hash table in accordance with network traffic statistics wherein the maintaining step includes the steps of:
      assigning a first relative weight to an access recency of each of the plurality of entries:

assigning second relative weight to an access frequency of each of the plurality of entries;

assigning a third relative weight to an application type of each of the plurality of entries;

assigning a fourth relative weight to a flow length popularity of each of the plurality of entries; and considering the combined weighted access recency, access frequency, application type, and flow length popularity of each of the plurality of entries.

24. A method according to claim 23, further comprising the steps of:

searching for the classification identifier in a storage different than the hash table if the look-up step fails; and adding a new entry to the hash table containing the classification identifier.

25. A method according to claim 24, wherein the maintaining step includes the step of removing an old entry from the hash table to accommodate the new entry.

26. A method according to claim 25, wherein the removing step includes the step of considering an application type of a flow corresponding to the old entry.

27. A method according to claim 25, wherein the removing step includes the step of considering a flow length popularity of a flow corresponding to the old entry.

28. A method according to claim 24, wherein the searching step including a recursive flow classification process.

29. A method according to claim 24, wherein the searching step includes a tuple space search process.

30. A method according to claim 23, wherein the maintaining step includes the step of considering an application type of a flow corresponding to each of the plurality of entries.

31. A method according to claim 23, wherein the maintaining step includes the step of considering a flow length popularity of a flow corresponding to each of the plurality of entries.

32. A method according to claim 23, further comprising the steps of:

pre-computing vectors corresponding to the weighted access recency, access frequency, application type, and flow length popularity of each of the plurality of entries.

33. A method according to claim 23, wherein the generating step includes the steps of:

extracting packet data header fields corresponding to the flow information from the data packet; and swapping bits in certain of the packet data header fields whereby hash keys are evenly distributed among entries in the hash table.

34. A method according to claim 33, wherein the packet data header fields include One or more of a source network layer address, a destination network layer address, a source transport layer port number, a destination transport layer port number, a type of service field, and a protocol field.

35. A method according to claim 23, further comprising the step of:

caching the hash table in a high-speed cache memory.

36. A method according to claim 23, further comprising the steps of:

resolving a collision between the generated hash key and another hash key generated from different flow information.

37. A method of classifying a data packet, comprising the steps of:

generating a hash key based on flow information in the data packet;

looking up an entry among a plurality of entries in a hash table containing a classification identifier using the hash key;

maintaining the hash table in accordance with network traffic statistics including the step of removing an old entry from the hash table to accommodate the new entry wherein the removing step includes the steps of:

assigning a first relative weight to an access recency of the old entry;

assigning a second relative weight to an access frequency of the old entry;

assigning a third relative weight to an application type of the old entry;

assigning a fourth relative weight to a flow length popularity of the old entry; and considering the combined weighted access recency, access frequency, application type, and flow length popularity of the old entry;

searching for the classification identifier in a storage different than the hash table if the look-up step fails; and adding a new entry to the hash table containing the classification identifier.

38. An apparatus according to claim 9, further comprising:

means for caching the hash table in a high-speed cache memory.

* * * * *